Sept. 27, 1966  W. C. REITZ, JR  3,274,844
DRIVE MECHANISMS

Original Filed Jan. 9, 1963  4 Sheets-Sheet 1

INVENTOR.
William C. Reitz, Jr.
BY
Fidler, Beardsley, Bradley
Patnaude & Retherbridge Att'ys.

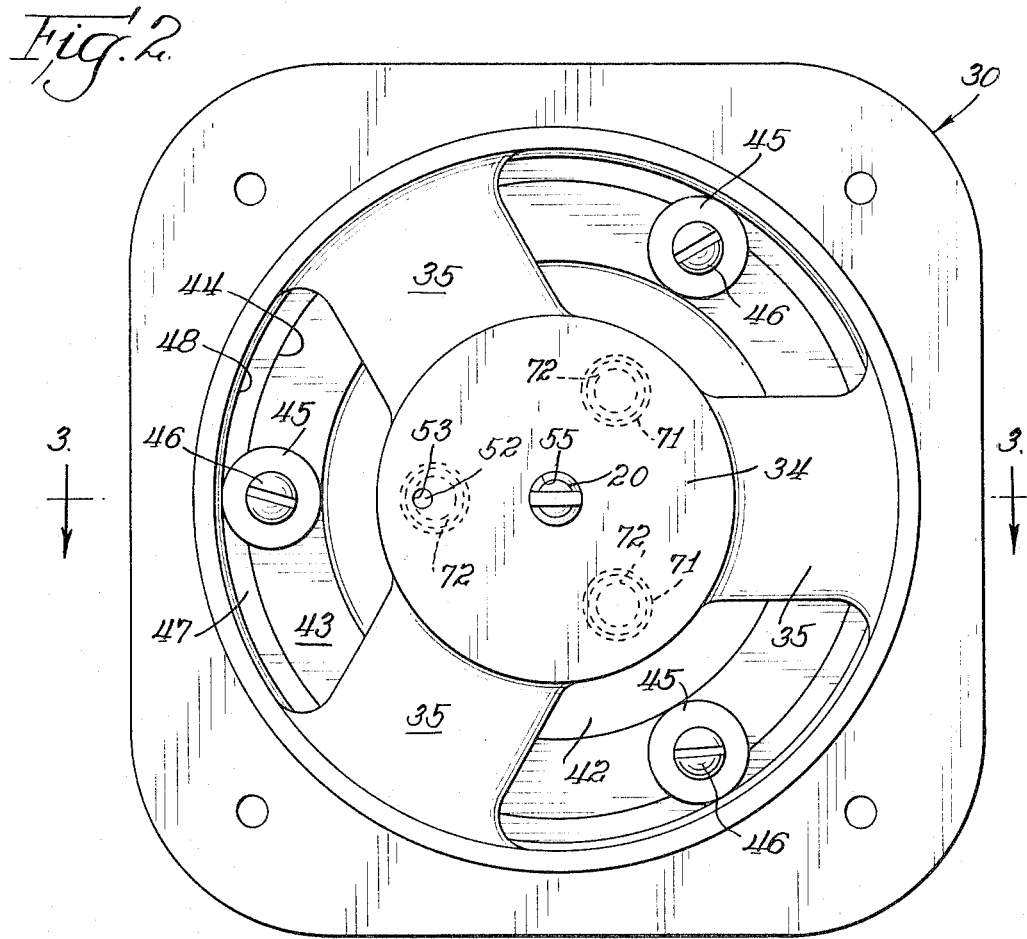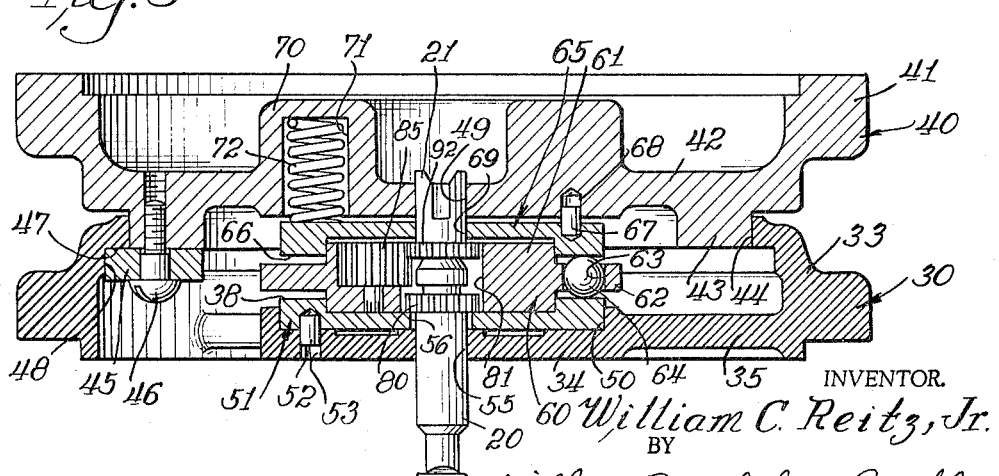

Sept. 27, 1966  W. C. REITZ, JR  3,274,844
DRIVE MECHANISMS
Original Filed Jan. 9, 1963  4 Sheets-Sheet 3
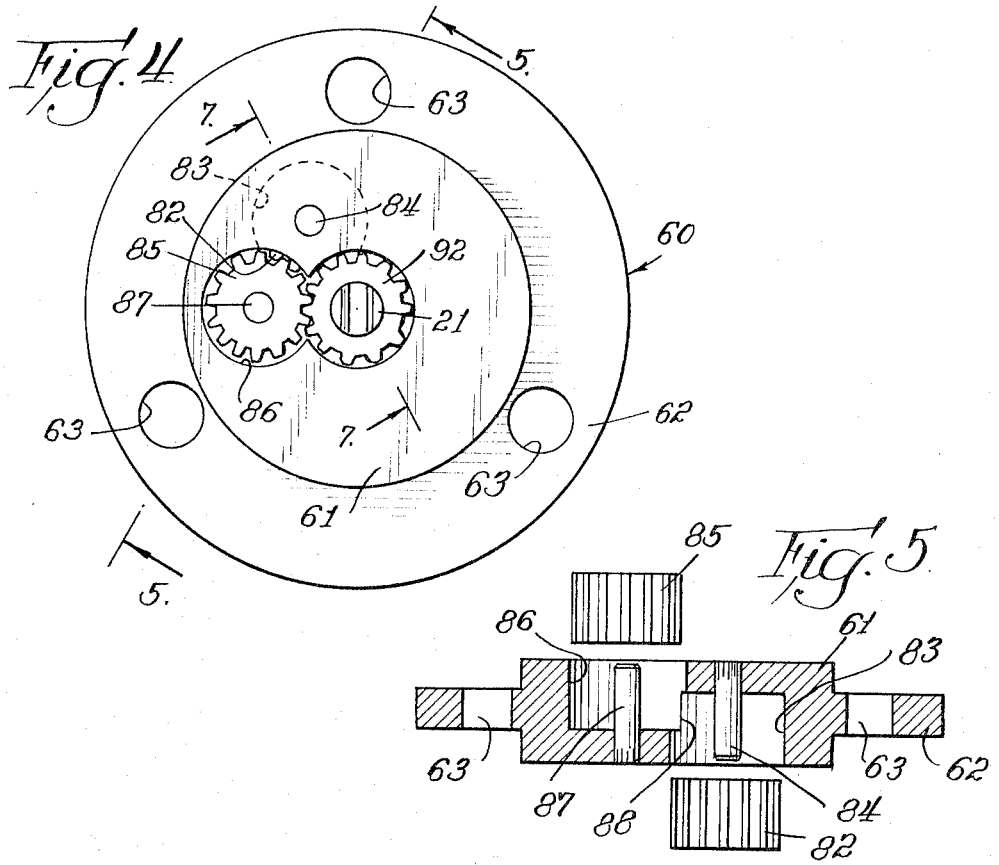
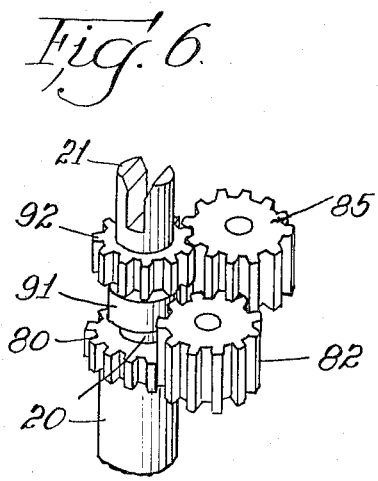
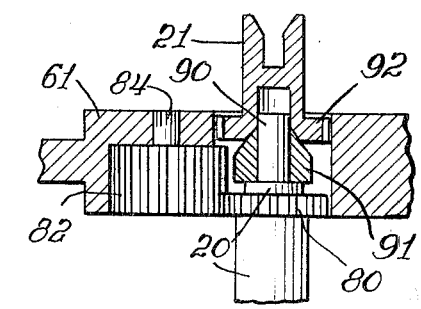
INVENTOR.
William C. Reitz, Jr.
BY
Fidler, Beardsley, Bradley
Patnaude & Petherbridge Att'ys.

Sept. 27, 1966 W. C. REITZ, JR 3,274,844
DRIVE MECHANISMS
Original Filed Jan. 9, 1963 4 Sheets-Sheet 4

INVENTOR.
William C. Reitz, Jr.
BY
Fidler, Beardsley, Bradley
Patnaude & Petherbridge Attys.

United States Patent Office 3,274,844
Patented Sept. 27, 1966

3,274,844
DRIVE MECHANISMS
William C. Reitz, Jr., Waukegan, Ill., assignor to Liquid Controls Corporation, North Chicago, Ill., a corporation of Illinois
Continuation of application Ser. No. 250,333, Jan. 9, 1963. This application Aug. 13, 1965, Ser. No. 483,006
3 Claims. (Cl. 74—384)

This invention relates to drive mechanisms and has to do more particularly with a new and improved drive mechanism or "swivel adaptor" which permits a driven device to be swiveled relatively to a driving device or vice versa without disturbing the drive relation between the driven device and the driving device. This application is a continuation of original application Serial No. 250,333, now abandoned, filed January 9, 1963 by the same applicant and assigned to the same assignee as the instant application.

One application of a swivel adaptor is in connection with a liquid meter and a register adapted to count and register the number of revolutions of the meter rotor. Registers commonly are provided with a series of number wheels which are exposed at one face of the register to indicate to the user the amount counted by the register. Such wheels ordinarily can be viewed from one direction only. Often it is desired to view the register from any one of a number of different positions. The meter usually is installed in fixed position and cannot readily be moved. Thus, in order to permit the number wheels to be viewed from various positions by the user the register is connected to the meter in such manner as to permit the register to be turned manually about an axis of the register to a position in which the number wheels can most readily be viewed.

In order that the register may be turned about an axis angularly, relative to the meter it is necessary to provide a drive mechanism which permits the register to be swiveled relatively to the meter without changing the relation between the number of revolutions of the meter output and the register input. In other words, the drive mechanism must be such that the register will register the proper amount corresponding to that measured by the meter regardless of the register having been turned about its axis from one position to another.

Drive mechanisms of the foregoing type as heretofore constructed have employed a differential mechanism including, in addition to the main driving gears, a pair of face gears and a pair of planet gears. Such construction is relatively expensive both because of the expense of making the face and planet gears and also because of the necessity of maintaining the necessary tolerances between the several parts.

In accordance with the present invention, a pair of meshing spider gears are connected between an input gear and an output gear and are rotatably carried by a bearing cage for movement bodily about the common axis of rotation of the input and output gears. A first member carrying the angularly adjustable mechanism is rotatable about the axis relatively to a second member carried on the fixed mechanism and one or more bearing members are rotatably carried in a turnable member or cage interposed between the first and second members whereby, upon the angular adjustment of the first member relatively to the second member, the cage is turned about the axis to move the spider gears in such manner that the output gear bears the same angular relation to the first member as though the angular movement of the first member had not taken place.

An object of the invention is to provide a new and improved swivel adaptor.

Another object is to provide a swivel adaptor which is simple and inexpensive to manufacture and assemble and which is effective in action.

Another object is to provide a swivel adaptor which can be made without the use of bevel gears.

Another object is to provide a swivel adaptor wherein the gears required do not exceed four in number.

Another object is to provide a swivel adaptor employing a pair of bearing races and wherein the construction is such that the faces of the races do not have to be ground or hardened.

Still another object is to provide a swivel adaptor which can be manufactured with a relatively small number of machine operations and with a minimum number of close tolerances.

Another object is to provide a drive mechanism for connection between a driving device and a driven device whereby one of the devices may be turned in random fashion angularly about the axis of the mechanism without altering the drive relation between the driving and the driven devices.

Another object is to provide a drive mechanism for connecting a register with a driving device whereby the register may be turned about an axis whereby to permit an observer to view the register from any point about the axis without affecting the accuracy of the register reading.

Other objects and advantages will appear from the following description taken in connection with the appended drawings wherein:

FIGURE 2 is an enlarged bottom plan view of the swivel adaptor of the present invention;

FIGURE 3 is a view of a section taken along line 3—3 of FIG. 2;

FIGURE 4 is an enlarged fragmentary view of a portion of the structure;

FIGURE 5 is a view of an exploded section taken along line 5—5 of FIG. 4;

FIGURE 6 is a fragmentary perspective view showing the gearing;

FIGURE 7 is an enlarged fragmentary sectional view showing a detail of construction;

Figure 1:
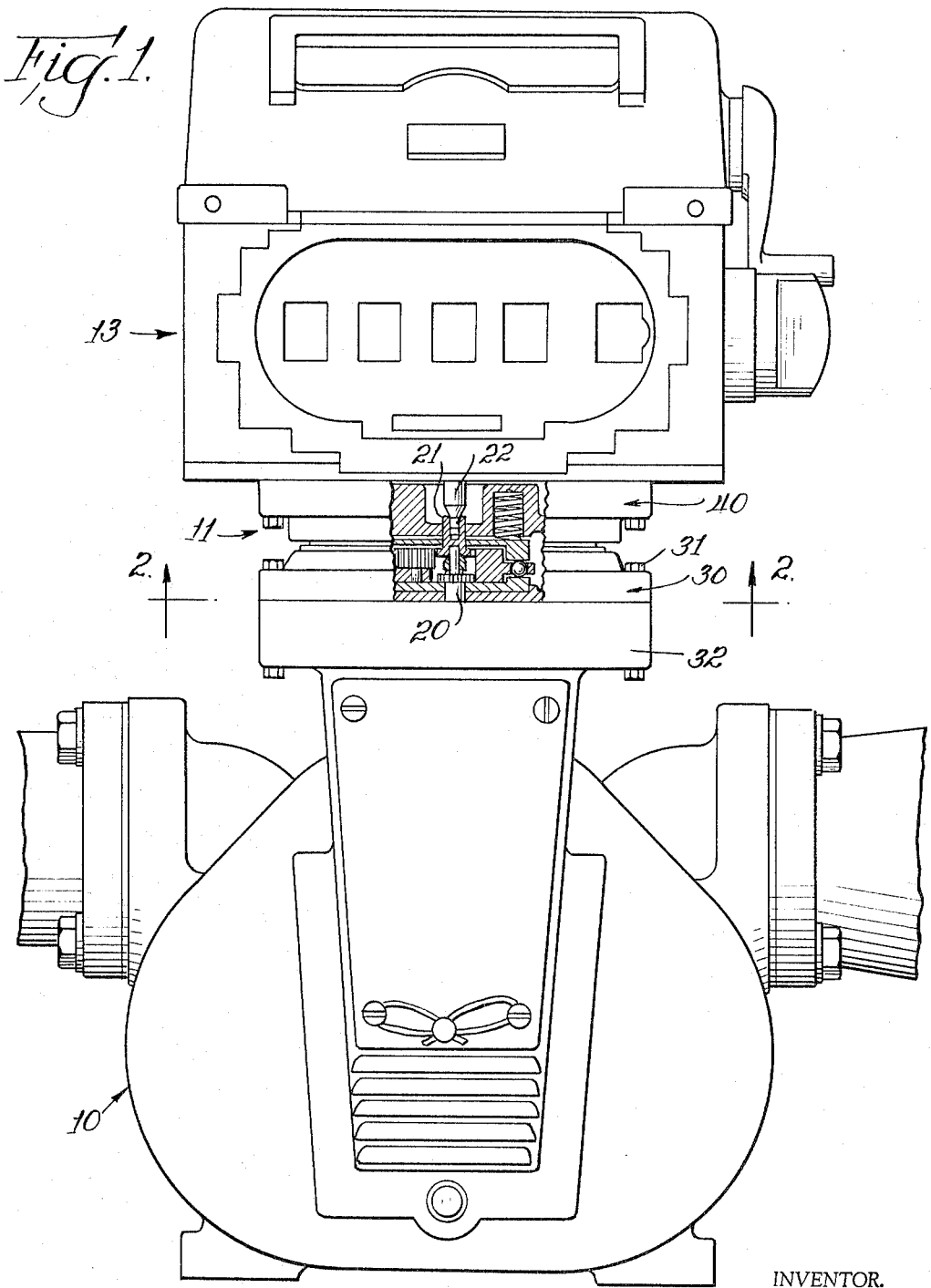
FIGURE 1 is a front elevational view of a meter and register having in association therewith a swivel adaptor constructed in accordance with the present invention, with parts broken away and in section.

Referring now to FIG. 1, the invention is illustrated in connection with a liquid meter 10 of the rotary type connected through the swivel adaptor 11 of the present invention to a register 13. The meter may be of any suitable type which is actuated by the flow of liquid therethrough and the details of the construction of the meter form no part of the present invention. However, by way of example, a meter such as disclosed in United States Patent to George B. Richards, No. 2,835,229, patented May 20, 1958, may be used.

The rotor (not shown) of the meter is connected to the input shaft 20 of the swivel adaptor through a suitable drive (not shown) of known construction. Preferably an adaptor (not shown) such as disclosed in United States patent to Henry Robert Billeter, No. 2,868,038, patented January 13, 1959 is connected between the rotor shaft (not shown) and the input shaft 20. An output shaft 21 of the swivel adaptor is connected as hereinafter described in detail to a register input shaft 22 of the register 13. The register 13 may be of any suitable known construction whereby upon rotation of the register input shaft 22 the number wheels (not shown) are actuated to register the revolutions of the register input shaft 22. In this connection, the drive connection (not shown) between the register input shaft 22 and the number wheels is such that even though the register input shaft 22 is driven in a reverse direction from the usual direction of rotation (for a reason which will be explained hereinafter), the number wheels will be driven in the proper direction to provide the desired indication of the revolutions of the register input shaft 22.

The swivel adaptor 11 includes a first flange member 30 which is fixed as by bolts 31 to a portion 32 of the meter casing. The first flange member 30 (see FIGS. 2 and 3), hereinafter sometimes referred to as the "fixed flange," is formed with a peripheral flange portion 33 and a central hub portion 34 connected to the flange portion 33 by spokes 35.

A second flange member 40, hereinafter sometimes referred to as the "movable flange," is provided. The second flange member 40 has a peripheral flange portion 41, a web 42, and an inner circular flange 43 depending from the web 42. The inner flange 43 is received in a circular socket 44 provided by the upper portion of the flange 33 of the first flange member 30. The second flange member 40 is retained against dislodgement from the first flange member 30 by a plurality of friction members 45 secured as by screws 46 to the underside of the flange 43 and engaging under a shoulder 47 on the flange 33 of the flange member 30 and bearing against a circular surface 48. The movable flange member 40 is turnable about the common axis of the flange members 30 and 40 and of the shafts 20 and 21 which axis may be considered the axis of the swivel adaptor. The friction members 45 prevent any undesired turning movement of the movable flange member as, for example, that which might result from vibration and limits turning movement to a deliberate movement by the operator.

The hub 34 is formed with a circular socket 50 in which is located a circular bottom race member 51 of cupped form having a surface forming a race 38. The bottom race member 51 carries a pin 52 which is slidably received in a bore 53 in the hub 34. Thus, the bottom race member 51 can move axially of the flange member 30 but is prevented from turning about the axis thereof. The hub 34 is formed with a bore 55 in which the shaft 20 is journaled and the shaft extends upwardly through a bore 56 in the bottom race member 51.

A spider cage or bearing cage 60 is located in the bottom race member 51 and is formed with a body portion 61 and a peripheral flange portion 62. The flange portion 62 is provided with a plurality of bores 63 (preferably three in number) in which are located rotatable bearing members such as balls 64 positioned to roll on the race 38. While a plurality of bearing members are shown, it will be understood that a single member may be employed. It will also be understood that instead of being formed as a ball, the bearing member may be cylindrical, or tapered such as conical, or generally conical with spheroidal surfaces.

An upper race member 65 formed similarly to the race member 51 is disposed in inverted position over the cage 60 and has a race 66 bearing against the balls 64. The upper race member 65 carries a pin 67 which is slidably received in a socket 68 in the movable flange member 40. Thus, the upper race member can move axially of the flange member 40 but is prevented from turning about the axis thereof.

While the race members are shown as having flat planar faces, it will be understood that they need not be planar. At least one of the race faces may be formed as a section of a cone, or at least one may be of stepped form with inner and outer portions of different spacing with bearing member of different sizes cooperating with the different race portions, respectively. Also, the faces of the races may be formed with grooves to receive the bearing members.

The upper race member 65 is formed with a bore 69 through which the output shaft 21 extends, with the upper end of the latter projecting above the web 42.

Upstanding from the web 42 is a circular inner flange 70 having one or more and preferably a plurality of recesses 71 (preferably three in number) in each of which is disposed a compression spring 72 which bears at its lower end against the upper face of the upper race member 65. When the swivel adaptor is in assembled condition the three springs 72 serve to urge the upper race member 65 against the three bearing balls 64 and thus maintain the latter in contact with the lower race 38. Accordingly, the races 38 and 66 are maintained in firm contact with the bearing balls 64 so that upon relative movement between the bearing cage 60 and either or both of the races 60 and 65 the balls roll along the races 38 and 66. In this connection, it will be noted that the races are so arranged that the bearing balls move in a path about the axis of the swivel adaptor.

The lower race member 51 is, as above stated, fixed with respect to the fixed flange 30, and the upper race member 65 is movable with the upper flange 40 about the axis of the swivel adaptor. The bearing cage 60 is rotatable about the axis of the swivel adaptor.

The input shaft 20 carries an input gear 80 (see FIGS. 5 and 6) which may be secured to or formed integrally with the shaft 20 and is located in a bore 81 in the bearing cage 60. The input gear 80 meshes with a first spider gear 82 located in a recess 83 in the bearing cage 60, the gear 82 being rotatably carried on a stub shaft 84 secured in the bearing cage 60.

The first spider gear 82 meshes with a second spider gear 85 located in a recess 86 in the bearing cage 60 and is rotatably mounted on a stub shaft 87 secured in the bearing cage 60. In order to permit the first spider gear 82 to mesh with the second spider gear 85, an opening 88 is provided between the recesses 83 and 86.

The input shaft 20 has a reduced portion 90 (FIG. 7) which projects upwardly above the input gear 80 and carries rotatably thereon a bearing 91 on which is disposed an output gear 92 which may be secured to or formed integrally with the output shaft 21. The output gear 92 is freely rotatable on the shaft 20 and meshes with the second spider gear 85.

The input gear 80 and the output gear 92 are sometimes herein referred to as the drive gears to distinguish them from the spider gears 82 and 85.

The ratio between the input gear 80 and the first spider gear 82 and between the output gear 92 and the second spider gear must be the same. Thus, the input and output gears 80 and 92 have the same number of teeth and the spider gears 82 and 85 have the same number of teeth. It is not necessary that all of the gears have the same number of teeth. Accordingly, there is a one-to-one relationship between the number of revolutions of the input shaft 20 and the output shaft 21, assuming that the movable flange remains fixed relatively to the fixed flange. However, it will be obvious that the direction of rotation of the output shaft 21 is opposite to the direction of rotation of the input shaft 20.

It will now be seen that upon rotation of the input shaft 20 it will rotate the input gear 80 which will drive the first spider gear 82, which latter will in turn drive the second spider gear 85 and the latter will drive the output gear 92 to drive the output shaft 21. Thus, upon rotation of the input shaft 20, the output shaft will be rotated the same amount but in a reverse direction, assuming that the movable flange remains fixed relatively to the fixed flange.

Assuming that the movable flange remains stationary, the bearing cage will remain stationary, and when the input shaft is rotated it will drive the input gear in a forward direction, which through the spider gears will cause the output gear to be driven in a reverse direction. Since the ratio of the gears is one-to-one, the output gear will be driven in a reverse direcion and for the same number of revolutions as the input gear.

If the input gear is not driven but is maintained stationary, and the movable flange is turned manually about the axis of the mechanism, this will carry the spider gears around the axis in the direction of movement of the movable flange. Since the ratio of the gears is as above-stated, the spider gear will move around the drive gears without rotating them. That is to say, as the input spider gear is moved around the input gear it drives the output spider gear, but since the latter is also being moved around the output gear at the same surface speed as it is revolving about the axis of the mechanism, it does not rotate the output gear with relationship to the counter and the latter remains at a fixed reading. Thus the relationship between the output shaft and the movable flange remains the same.

If the movable flange is turned about the axis of the mechanism at the same time that the input shaft is rotated, this will not change the number of revolutions of the output shaft relatively to the movable flange, but the relation between these members will be the same as though the movable flange had not been turned.

The bearing race members preferably are formed from cold rolled steel and without case hardening or otherwise finishing the race surface. It has been found that the rolling action of the bearing members on the surfaces when the swivel adaptor is used serves to provide the necessary finishing of the race surfaces.

Figure 8:
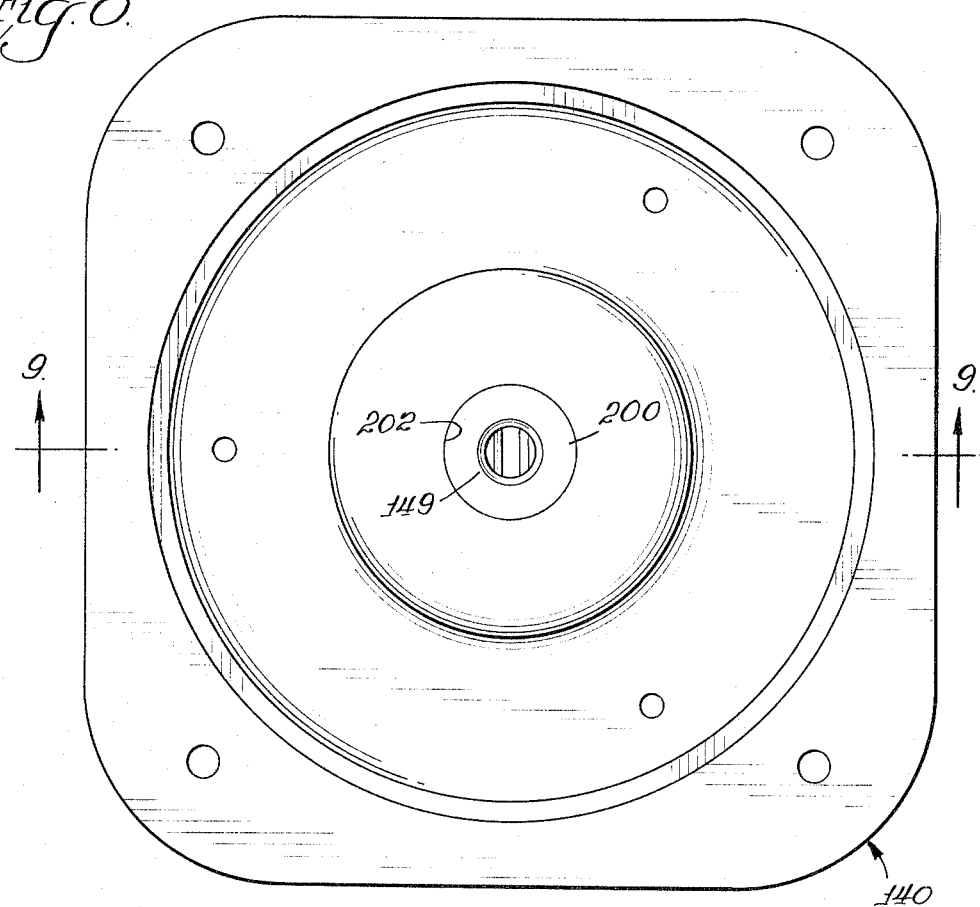
FIGURE 8 is a top plan view of a modified form of swivel adaptor.
Figure 9:
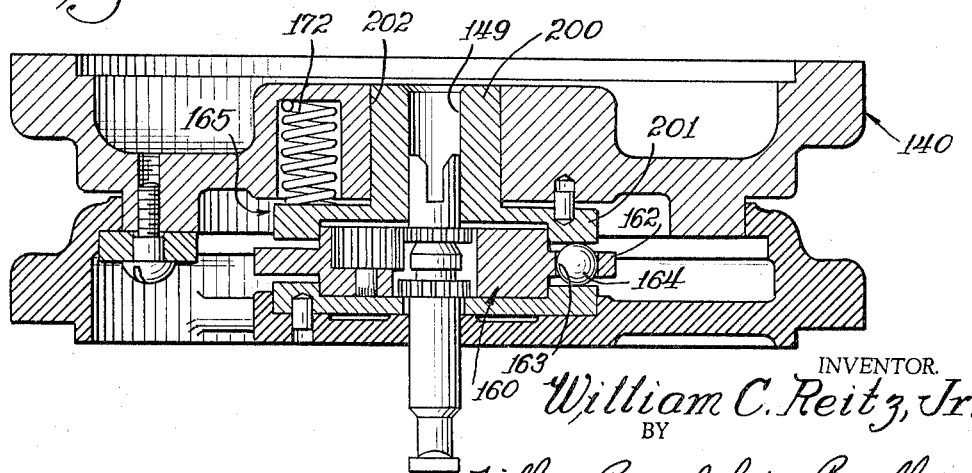
FIGURE 9 is a view of a section taken along line 9—9 of FIG. 8.

A modified form of the swivel adaptor is shown in FIGS. 8 and 9. This form of swivel adaptor is similar in construction and operation to that shown in FIGS. 1 to 7 except that it employs only a single ball bearing and the bearing cage and upper race are modified to permit the use of only a single ball bearing.

The ball cage 160 is similar in construction to the ball cage 60 except that it has only a single bore 163 in its flange 162 and receives only a single ball bearing 164.

The upper race member 165 is generally similar to the race member 65. However, it is formed with a hub 200 which is integral with and upstands from the body portion 201 and has a bore 149 which receives and serves as a bearing for the output shaft 21.

The upper flange member 140 is similar to the flange member 40 except that it is provided with a bore 202 which receives the hub 200. The hub 200 has sufficient clearance in the bore 202 to permit the upper race member to be moved into engagement by the springs 172, but the fit is sufficiently snug to prevent the upper race member from tilting.

A demonstration of the manner in which the device provides the desired registration will now be furnished.

It will be understood that in the following discussion, the equations and tabulations, the terms "fixed flange" and "movable flange" are used respectively to designate the flange which in the illustrative embodiment is disclosed as fixed and the flange which is disclosed as movable about the common axis of the flanges. However, it will be appreciated that in certain other applications of the invention both flanges are movable, and the terms "fixed flange" and "movable flange" as used herein may be taken also as referring to the two different flanges of the mechanism even though both are movable.

In the following equations and tabulation, the several terms are used as follows:

Bearing case=number of revolutions of the bearing cage or spider cage.
Input=number of revolutions of the input gear or shaft.
Output=number of revolutions of the output gear or shaft.
Fixed flange=number of revolutions of the fixed flange about the axis.
Movable flange=number of revolutions of the movable flange about the axis.
Registration=the number of revolutions of the output gear or shaft minus the number of revolutions of the movable flange.

It will be seen that the mechanism is essentially a differential mechanism. Accordingly, the relationship between the number of revolutions of the bearing cage and the input and output gears may be expressed:

(1) $$\text{Bearing cage} = \frac{\text{input} + \text{output}}{2}$$

It is, of course, known that when a pair of spaced parallel surfaces are in contact with a rotatable member such as a ball, cylinder or cone, and are moved in opposite directions relatively to each other, the rotatable member is rotated about its axis at a rate which is one-half the rate of relative movement between the surfaces. In other words, the rotatable member will be rolled a distance which is one-half the distance which the surfaces move relatively to each other. This relationship is true whether the surfaces are straight or circular.

In the device of the present invention, when the movable flange is turned about the common axis of the flanges, the bearing race carried by the movable flange is moved relatively to the bearing race carried by the fixed flange. Thus the bearing members are moved (and consequently the bearing cage is moved) a distance which is half the distance that the movable flange is moved relatively to the fixed flange. Hence the bearing cage is rotated half the number of revolutions that the movable flange is turned. This relation may be expressed:

(2) $$\text{Bearing cage} = \frac{\text{movable flange} + \text{fixed flange}}{2}$$

Combining Equations 1 and 2 above, and dividing by two, gives:

(3) Input+output=movable flange+fixed flange

Solving for output gives:

(4) Output=movable flange+fixed flange−input

It is, of course, the purpose of the present invention to insure that regardless of the number of revolutions through which the movable flange is turned, the meter will register the number of revolutions of the input gear or shaft. In other words, the output shaft should halt in the same position relative to the movable flange regardless of the number of revolutions of the latter.

"Registration" as above defined in the relationship between the number of revolutions of the output gear or shaft and the movable flange. This relationship may be expressed:

(5) Registration=output−movable flange

Thus, regardless of the number of input revolutions or the number of revolutions of the movable flange, the registration will be the same as the number of input revolutions. Accordingly, the meter will register a value corresponding to the input revolutions regardless of the number of revolutions that the register may have turned about the common axis of the flanges.

The functioning of the device to provide the desired registration under various conditions is shown in the following tabulation. It will be understood that the figure "1" indicating one revolution of the movable flange, and the figure "100" indicating one hundred revolutions of the input gear or shaft, are merely examples, and the values will vary under varying operating conditions.

| Movable Flange | + Fixed Flange | − Input | = Output |
|---|---|---|---|
| 0 | 0 | 100 | = −100 |
| 1 | 0 | 100 | = −99 |
| −1 | 0 | 100 | = −101 |
| 1 | 0 | 0 | = 1 |
| −1 | 0 | 0 | = −1 |
| 0 | 0 | −100 | = 100 |
| 1 | 0 | −100 | = 101 |
| −1 | 0 | 100 | = 99 |

| Output | − Movable Flange | = Registration |
|---|---|---|
| −100 | 0 | = −100 |
| −99 | 1 | = −100 |
| −101 | −1 | = −100 |
| 1 | 1 | = 0 |
| −1 | −1 | = 0 |
| 100 | 0 | = 100 |
| 101 | 1 | = 100 |
| 99 | −1 | = 100 |

It will be seen that in the foregoing tabulation in every instance the registration is equal to the input even where, as in the last three examples, the input is negative or in a reversed direction.

While in the present application, the pinion carried by the fixed flange is shown as being the input pinion and the other pinion is shown as the output pinion, it will be understood that the drive may be reversed and the pinion which is mounted in the movable flange may serve as the input pinion and the other pinion may serve as the output pinion.

While the present invention is disclosed in connection with a meter and a register, it will be understood that it is not thus limited but that it may be employed in any application wherein it is desired to permit a driven mechanism to be turned about the axis of the drive connecting the driven mechanism to the driving mechanism or vice versa and at the same time to maintain the registration.

In the use of the swivel adaptor of the present invention in connection with a liquid meter and a register, it is connected between such devices in the manner shown in the drawings and above described.

Liquid is caused to flow through the meter to rotate the rotor (not shown) and thus rotate the input shaft 20. Assuming that the register 13, and consequently the movable flange 40, is held against movement about the axis of the adaptor, the register will be driven in the usual manner and will register an amount equal to the amount of liquid passing through the meter; in other words, an amount corresponding to the number of revolutions of the meter rotor. Should the observer desire to view the number wheels (not shown) of the register from a different position than that in which the register is then located, he can turn the register manually about the axis of the adjustor. For reasons above explained, the turning of the register about the axis will not affect the amount shown by the number wheels but the amount will be the same as though the register had not been turned about the axis of the adaptor. Moreover, even should the operator turn the register about the axis of the adaptor at the same time that the meter is operated to drive the register, the amount shown by the register wheels will be the same as though there had been no turning movement of the register about the axis of the adaptor.

I claim:
1. A swivel adapter comprising:
(a) an input and an output shaft each having a spur gear rigidly attached thereto;
(b) a first flange rotatably mounting said input shaft, and a second flange rotatably mounting said output shaft,
(c) means mounting said first and second flanges so that the spur gear on the input shaft and the spur gear on the output shaft are between the two flanges and the input and output shafts define a collinear central axis, and so that the flanges can rotate relative to each other about an axis concentric with said central axis;
(d) a pair of bearing races mounted between said flanges, one of said pair of races being non-rotatably connected to one of said flanges and the other of said pair being non-rotatably connected to the other of said flanges, at least one of said pair of races being axially movable on the flange on which it is mounted;
(e) a bearing cage mounted between said pair of bearing races;
(f) roller bearing means mounted within said bearing cage for maintaining a predetermined minimum spacing between sad races and causing said cage to be rotatable about said central axis;
(g) means for resiliently urging the race that is axially movable toward the other race so that said rolling bearing means is in frictional and rolling engagement with said pair of bearing races and responds to relative angular rotation between said flanges by imparting a predeterminedly smaller angular rotation to said bearing cage;
(h) a pair of meshing spider gears rotatably mounted in said bearing cage so that rotation takes place about spaced axes that are parallel to said central axis, one of said spider gears meshing with the gear on said input shaft, and the other of said spider gears meshing with the gear on said output shaft; and
(i) means for limiting radial displacement of said bearing cage about said central axis.

2. A swivel adapter in accordance with claim 1 wherein said means for limiting radial displacement includes counter bore means in each pair of bearing races, said counter bore means facing one another, said bearing cage being mounted in said counter bore means to limit radial displacement of the latter about said axis.

3. A swivel adapter in accordance with claim 1 wherein said races have planar surfaces that lie in parallel planes normal to said central axis, and said bearing means includes a plurality of balls mounted in said cage in rolling engagement with the planar surfaces of said races.

References Cited by the Examiner

UNITED STATES PATENTS

| 2,289,869 | 7/1942 | Berck. |
| 2,309,332 | 1/1943 | Tancred. |
| 2,467,870 | 4/1949 | Stephenson | 74—798 X |
| 2,839,952 | 6/1958 | Ondeck | 74—798 X |

FOREIGN PATENTS 715,668   9/1954   Great Britain.

FRED C. MATTERN, Jr., *Primary Examiner.*

BROUGHTON G. DURHAM, MILTON KAUFMAN,
*Examiners.*

D. H. THIEL, *Assistant Examiner.*